(12) United States Patent
Grenet

(10) Patent No.: US 9,740,307 B2
(45) Date of Patent: Aug. 22, 2017

(54) PROCESSING UNIT, COMPUTER PROGRAM AMD METHOD TO CONTROL A CURSOR ON A SCREEN ACCORDING TO AN ORIENTATION OF A POINTING DEVICE

(71) Applicant: MOVEA, Grenoble (FR)

(72) Inventor: Pierre Grenet, Grenoble (FR)

(73) Assignee: Movea, Grenoble (FR)

( * ) Notice: Subject to any disclaimer, the term of this patent is extended or adjusted under 35 U.S.C. 154(b) by 41 days.

(21) Appl. No.: 14/991,046

(22) Filed: Jan. 8, 2016

(65) Prior Publication Data
US 2017/0199585 A1    Jul. 13, 2017

(51) Int. Cl.
*G06F 3/038* (2013.01)
*G06F 3/0346* (2013.01)

(52) U.S. Cl.
CPC ............ *G06F 3/0346* (2013.01); *G06F 3/038* (2013.01)

(58) Field of Classification Search
CPC ............................... G06F 3/0346; G06F 3/038
USPC ........................................................ 345/158
See application file for complete search history.

(56) References Cited

U.S. PATENT DOCUMENTS

| | | | |
|---|---|---|---|
| 7,102,616 B1* | 9/2006 | Sleator ................ | G06F 3/0325 345/156 |
| 2010/0156785 A1* | 6/2010 | Nakaoka .............. | G06F 3/0346 345/157 |
| 2012/0162214 A1* | 6/2012 | Chavez ................. | G06F 3/012 345/419 |
| 2012/0274560 A1* | 11/2012 | Caritu .................. | G06F 3/0346 345/158 |
| 2013/0038529 A1* | 2/2013 | Hwang ................ | G06F 3/0487 345/157 |
| 2014/0232649 A1* | 8/2014 | Youssef ............... | G06F 3/0346 345/157 |

* cited by examiner

*Primary Examiner* — Andrew Sasinowski
*Assistant Examiner* — Chineyere Wills-Burns
(74) *Attorney, Agent, or Firm* — Bay Area Technology Law Group PC

(57) ABSTRACT

The invention relates to a processing logic for determining a position of a virtual object on a display configured to: receive from one or more motion sensors motion signals representative of an orientation of a first device and/or a derivative thereof; obtain a first set of data representative of the orientation of the first device based on the motion signals; obtain a second set of data representative of the orientation of the first device based on the motion signals, said second set of data being different from the first set of data; calculate a first candidate position of the virtual object on a display based on the first set of data; calculate a second candidate position of the virtual object on the display based on the second set of data; select one of the first candidate position and the second candidate position as a position of the virtual object on the display.

20 Claims, 11 Drawing Sheets

PROCESSING UNIT, COMPUTER PROGRAM AMD METHOD TO CONTROL A CURSOR ON A SCREEN ACCORDING TO AN ORIENTATION OF A POINTING DEVICE

FIELD OF THE INVENTION

The present invention relates to the use of 3D pointers. These pointing devices are used for a variety of different purposes: control the functionalities of a TV set or a tablet, using or not a set top box, control a presentation on a desktop or a larger screen, play games, etc. . . . . A 3D pointer includes motion sensors which capture the motion imparted to the pointer by a user handling it. In most applications, the motion of the device in space is converted into the position and/or motion of a virtual object, often times a cursor, on a surface, for example a plane or a curve, generally a display. By controlling the object and moving it across the plane, the user is able to command the execution of specific functions, like e.g. selection of a program, for instance a game, control of an audio or a video stream, creation of drawings and graphics, etc. . . .

BACKGROUND PRIOR ART

In most cases the surface, or display, is of finite size, but the movements of the pointer are usually not limited in space. This means that the movements of the user can drive the position of the object beyond the limits of the display. First, we consider the case of a conventional 2D computer mouse that the user moves across the horizontal desk surface to move the cursor on a display or screen. It is known that when the user moves too far in a certain direction, the actual cursor stops and remains at the screen border because the cursor cannot move beyond the limits of the screen. The advantage of this principle is that it is quite easy to use the objects at the edges of the screen, such as the scroll bar or the close button, since they seem to have an infinite width (in the direction beyond the screen). Therefore, the user does not have to perform a precise movement to select these objects.

In tracking methods known as "relative pointing", a change of the position of the cursor is iteratively calculated according to the movement imparted by the user to the pointing device. When the position of the object is saturated at the borders of the display, the change of position is applied only if it does not cause the position of the object to leave the display. A problem with the behaviour of the 2D mouse at the screen border in relative pointing is that the cursor starts moving as soon as the user reverses direction. This creates an offset between the position of the cursor and the position of the mouse compared to when the user moved the pointer and the position of the cursor was about to leave the screen. A commonly used correction when using a 2D computer mouse is to have the user lift and displace the mouse to cancel this offset.

As an alternative, the position of the object may be tracked beyond the limits of the screen using absolute pointing, and the position of the object may be displayed, when the object is outside the screen, at the border of the screen. In absolute pointing, the orientation of the pointing device is converted into a position of the cursor on the screen. Using this method, each orientation of the pointing device may be converted into a position of the object on an infinite screen, and this position is saturated at the limits of the screen. This infinite screen may have different shapes and may be, for example, planar, curved, cylindrical, or spherical.

The method above allows displaying the object permanently on the screen, at a position which is intuitive for the user, when the orientation or pointing direction of the pointing device remains close to the screen. The position of the cursor is calculated as if the screen was infinite, and saturated at the border of the screen. Thus, when the orientation of the device results in the object (cursor) leaving the screen, the object will still appear at the border of the screen, at the position which is the closest to the actual position of the object in the infinite screen. When the position of the object in the infinite screen re-enters the finite screen, the virtual object starts moving within the finite screen, from the position at which the virtual object re-enters the screen.

However, this solution is not satisfactory when the user is pointing far away from the screen, for example with the orientation of the device pointing substantially away from the screen. More specifically, this solution may produce discontinuities, unintuitive, or illogic behavior in the position of the cursor if the user exits the screen on one side of the screen and returns to the screen from one of the other 3 sides. For example, if the user exits the screen to the right, the position of the object in the screen will be saturated at the right edge of the screen. If the user keeps rotating the device he or she will arrive at a position pointing 180 degrees away from the screen. During this rotation the object on the infinite screen has kept moving to the right. However, the user can also point away from the screen by rotating the device up and keep moving until the device is pointing 180 degrees from the screen. In this case, the object on the infinite screen has been moving up. Therefore, the same orientation of the device can lead to two different positions of the object on the infinite screen. The origin of this problem, and the reason for the potential illogical behavior of the object, is the fact that when the user moves the pointing device it describes a sphere, and the position of the object derived from this spherical orientation is converted into an object position on a planar (infinite) surface.

There is therefore a need for a pointing system that solves the above-mentioned problems and provides improves the prior art.

SUMMARY OF THE INVENTION

The invention allows displaying a virtual object on a screen whatever the orientation of a pointing device. The virtual object can be a pointer a cursor, or any kind of object to display which is controlled by movements of a user. In addition, the invention provides a logical and intuitive relation between the motions of the pointing device and the behavior of the virtual object on the screen.

BRIEF DESCRIPTION OF THE DRAWINGS

The invention will be better understood and its various features and advantages will emerge from the following description of a number of exemplary embodiments and its appended figures in which.

DETAILED DESCRIPTION OF THE INVENTION

The aim of the invention is to control and show a virtual object, such as e.g. a cursor, on a display plane as a function of the orientation or motion of a handheld pointing device controlled by a user. In the presentation and discussion of the invention that follows the virtual object will be referred to as the cursor, and the display plane will be referred to as the display for simplicity but this should not be seen as a restriction. More generally, the invention is applicable to any virtual object that can be moved by a user using a pointing device, such as, for example, an icon, an item of a video game that could be moved around a screen, etc. Similarly, position of the cursor on the display will determined based on the orientation of the pointing device with respect to a fixed reference frame, but the position of the cursor may also be determined based on the motion of the pointing device, or other derivatives of the orientation. The orientation of the device may be expressed in various ways, such as for example, Euler angles, rotation matrices, or quaternions. The orientation data of the pointing device may further be associated with position data indicating the position of the device with respect to the display.

The determination of the cursor position on the display as a function of the orientation of the display device may be referred to as converting the orientation to a cursor position. Alternatively, this may also be referred to as mapping the orientation to a cursor position. Many different conversion or mapping techniques exists in the prior art and generally consist in mathematical equations or models that convert the parameters that define the orientation of the pointing device into parameters that define the position of the cursor on the display. Examples of these mapping techniques and the construction of mathematical models and equations may be found in European patent application EP 2754012, which may be consulted for further details and is hereby incorporated by reference in its entirety. One example will now be discussed.

Figure 1:
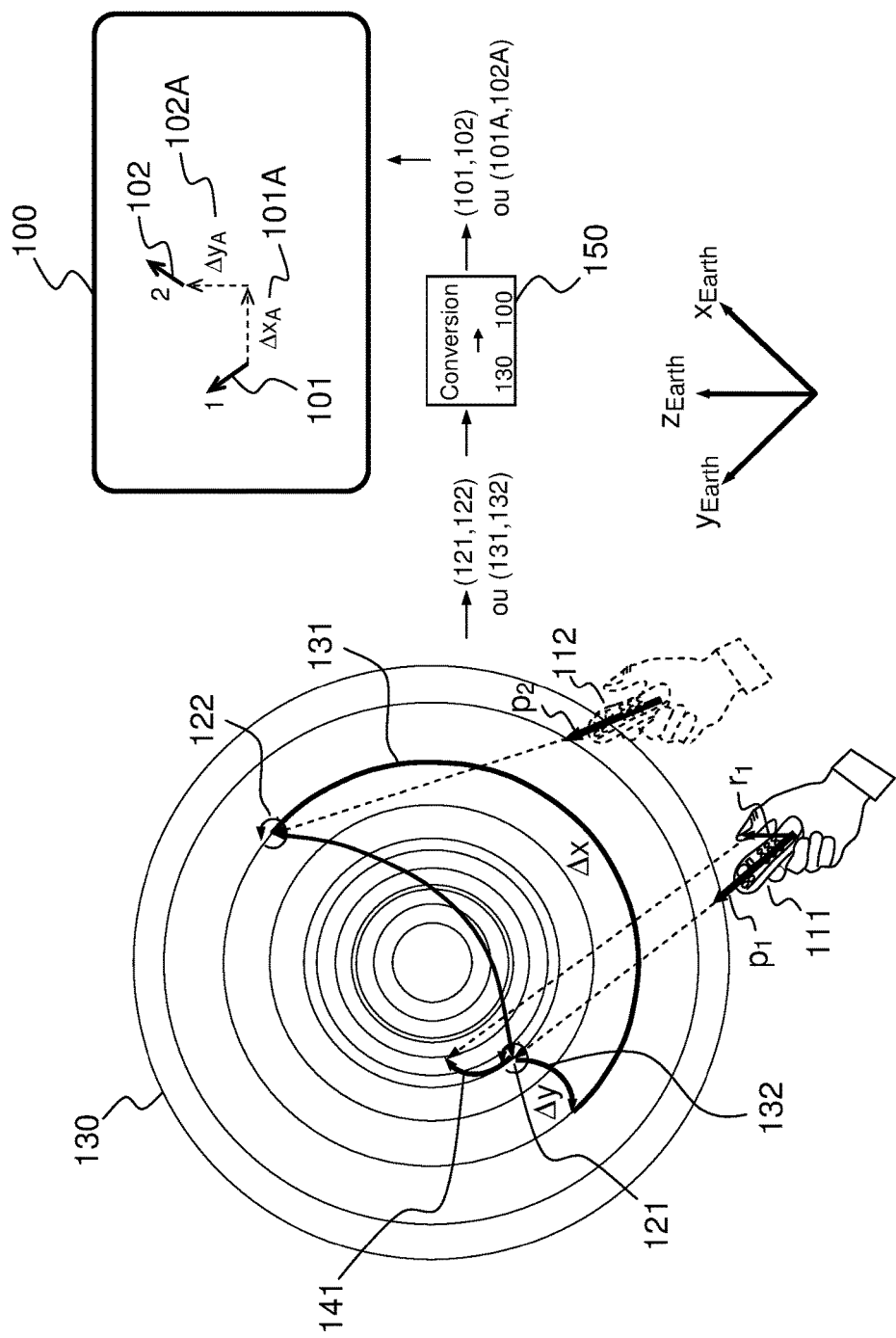
FIG. 1 represents a pointer held by a user to control an oriented cursor on a display surface, which is this case is a flat screen, and a projection surface with the various frames according to an embodiment of the invention.

FIG. 1 represents a pointer held by a user to control an oriented cursor on a display surface, which is this case is a flat screen, and a projection surface with the various frames according to an embodiment of the invention.

The aim is to provide a procedure for determining the parameters of position or of displacement of the cursor 101, 102 in a screen 100 driven by a pointing device (or pointer) in terms of position 111 or 112, the attitude (or orientation) and/or the position of the pointer being known in a reference frame tied to the display surface which is generally the earth frame ($X_{Earth}$, $Y_{Earth}$, $Z_{Earth}$). The pointer is a tool carried by the user which is positioned and oriented by the user and which allows the latter to point in a direction, and the cursor is the reference of the pointing on an object/screen, or display surface.

To determine the position and the orientation of the cursor on the screen in accordance with the motions imparted to the pointer by the user, the principle of the invention introduces a surface of intermediate projection, 130, of the "pointing vector" p1 (respectively p2) carried by the pointer, 111 (respectively 112). Let us note that the projection surface 130 may coincide with the display surface or be different (as is illustrated in FIG. 1). The projection surface is described and known in the reference frame tied to the display surface. As indicated further on in the description, the choice of the projection surface is dependent on the application and can be chosen so as to obtain the most ergonomic rendition suited to the application. It can also change as a function of the context of use and it is also possible to use several models of surfaces of projection in relation to the components of the cursor. The choice of this projection surface also depends on the available information, out of the orientation and/or the position of the pointer in the reference frame. The intermediate projection surface is a (conceptual) help to derive the conversion/mapping equations that convert the orientation of the pointing device into the cursor position or displacement.

The invention utilizes the data of orientation and/or of position of a movable pointer, given in a reference frame (or often terrestrial frame) to compute the position or the displacement or the orientation of a cursor on a display screen. In one embodiment, this method makes it possible for example to reproduce the effect of displacement of a cursor generated by a laser pointer, while making it possible to drive an application, for example by contextual menus of the position or of the orientation of the cursor on the display surface. The choice of the projection surface makes it possible to modify the relation between the displacement of the movable pointer and the displacement of the cursor on the display surface. The reference frame is tied to the display surface. The display surface generally being fixed in the terrestrial frame, this reference frame therefore generally coincides with the terrestrial frame.

The movable pointer is mapped in the reference frame with the aid of a measurement unit which provides the orientation and/or the position of the pointer in this frame. For a better understanding of the invention, it is proposed to classify the measurement unit into two categories. The first utilizes only a measurement unit onboard the movable pointer. It is for example possible to use inertial and magnetic motion sensors such as accelerometers, magnetometers, gyrometers which make it possible, alone or by combination, to provide the orientation or the position of the pointer in the reference frame. The second category comprises a measurement unit which requires instrumentation fixed in the reference frame. For example, optical, magnetic or electromagnetic systems, sound or ultrasound systems, radio systems make it possible to locate the movable pointer in terms of position and/or orientation in the reference frame and they require instrumentation of the reference frame.

The methods discussed can be applied when only the orientation data of the movable pointer is available, in which case, the position may be assumed to be defined in an arbitrary manner with respect to the projection surface. Likewise if only position data are known, it may be possible to assume that the orientation is known in an arbitrary manner. It is generally simpler and less expensive to instrument the pointer so as to obtain the measurements of its orientation. The position of the pointer is then defined in an arbitrary manner.

The frame of the movable pointer is endowed by a vector p which may indicate the direction of pointing. The pointing vector p may be defined fixed in the frame of the movable pointer in such a way that p is directed in the direction and the natural (ergonomic) sense of pointing of the movable pointer. The orientation and/or the position of the frame of the movable pointer in the reference frame also makes it possible to provide a second data item of orientation of the movable pointer through the definition of a second vector belonging to the plane perpendicular to the vector p (for example denoted r1 in FIG. 1, corresponding the position 111 of the pointer). This second orientation vector r1 makes it possible if appropriate to compute an orientation of the cursor on the display surface.

In a so-called "absolute pointing" mode, direct use is made of the coordinates of the point 121 (for the pointer in position 111) or 122 (for the pointer in position 112) in the projection surface and optionally a transformation (150) between the projection surface and the display surface to obtain the coordinates of the cursor in the display surface. Thus, a physical position/orientation of the movable pointer in the reference frame corresponds to only one position of the cursor in the display surface.

The computation of 121, 122 as a function of the position and/or orientation of the movable pointer can be carried out analytically for models of simple surfaces and assumptions on the position of the movable pointer, as is detailed herein below. The computation of displacement of the cursor on the display surface can then be implemented directly by application of the analytical formula found. The computations set forth make it possible to cover many different applications and ergonomics. However it will also be possible to cover other cases, with other projection surfaces and/or other cases where the data regarding positions and/or orientation of the movable pointer must be taken into account and e.g. no analytical models can be deduced. The invention is generalized to these other cases. If the analytical computation is complex or impossible to conduct, for example for complex or arbitrary surfaces, it will be possible to use numerical procedures for computing intersection of straight lines with surfaces (ray tracing procedures for example). The numerical computation of intersection of the pointer with the surface may then be integrated into the cursor displacement computation.

The successive orientation/positions of the movable pointer over time (for example demarcated by 111 and 112 as successive positions and orientation of the pointer over time) are thus transformed into positions/orientations of the cursor on the screen (101 corresponds to 111, and 102 corresponds to 112).

In a so-called "relative pointing" mode, the position of the cursor on the screen is driven by data of successive displacements which increment its position on the display surface. This type of pointing is similar to that very widely developed for pointing devices of mouse type for computers. FIG. 1 makes it possible to illustrate this principle. Let p1 and p2 be the direction vectors associated with the frame of the movable pointer for two successive instants. 121 and 122 are the projection points of these vectors p1 and p2 on the projection surface. They make it possible to form a difference vector ($\Delta x$, $\Delta y$) (denoted 131, 132) in the metric system associated with the projection surface. ($\Delta x$, $\Delta y$) are optionally transformed by a transformation 150 from the projection surface to the display surface and the result (101A, 102A) is used to control the displacement ($\Delta x_A$, $\Delta y_A$) of the cursor on the display surface.

It is possible to control the orientation of the cursor on the screen with the aid of the movements of the pointer, thereby making it possible to launch different functions as a function of this orientation of the cursor. As illustrated in FIG. 1, the projection of the vector r1 perpendicular to p1 onto the projection surface provides a second vector 141. The direction of the vector 141 thus formed in the projection surface (in the sense of the metric of the surface 130) makes it possible to drive the orientation of the cursor in the display surface by the same transformation 150.

Figure 2A:
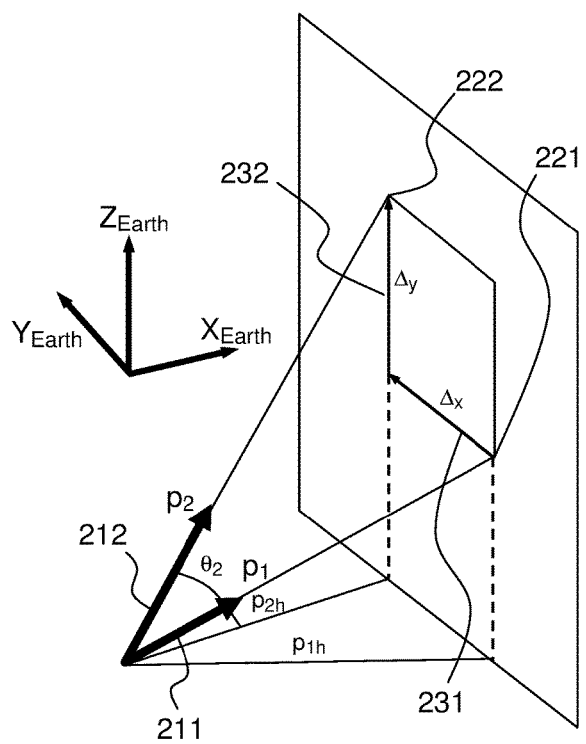
FIGS. 2a, 2b and 2c represent the principle of determining the displacement parameters or position parameters of a cursor on the basis of the angles of yaw and of pitch of the direction vector carried by a pointer in a reference frame and by using a vertical plane projection surface, according to an embodiment of the invention.
Figure 2B:
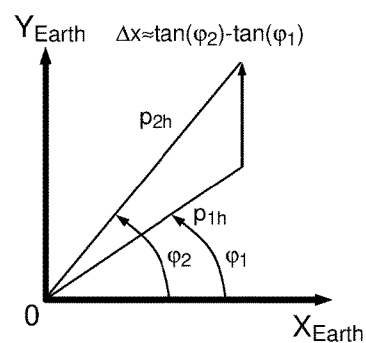
Figure 2C:
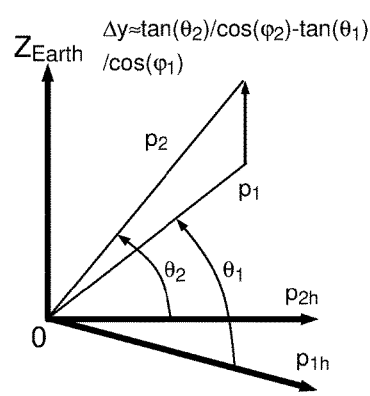
Figure 2D:
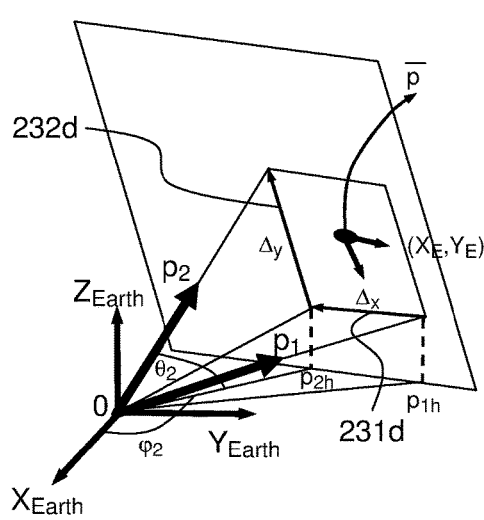
FIGS. 2d, 2e and 2f represent the principle of determining the displacement parameters or position parameters of a cursor on the basis of the angles of yaw and of pitch of the direction vector carried by a pointer in a reference frame and by using a small section of an arbitrary projection surface, according to an embodiment of the invention.
Figure 2E:
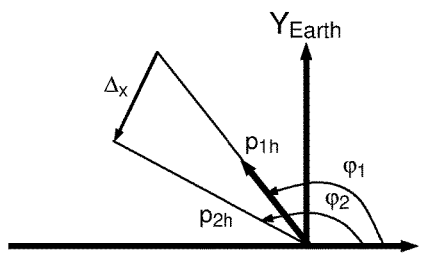
Figure 2F:
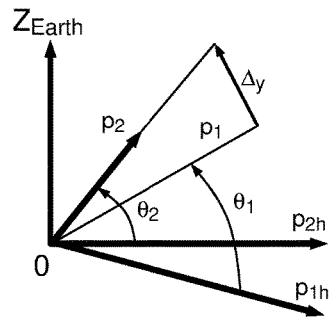

The computation of the orientation of the cursor on the screen can for example be performed in the following manner:

the vector r1 is given for example by the second or third column of the movable pointer attitude matrix R (p1 being defined by the first column), the definition of which is detailed further on in the description;

then the angle which determines the orientation of the cursor in the frame of the projection surface can be computed by:

$\phi = A\tan(r'1 \cdot Y_E / r'1 \cdot X_E)$ where r'1 is the projection of r1 in the direction of p1 to the projection surface, "." is the scalar product operator, $X_E$, $Y_E$ form a frame on the projection surface (see FIGS. 2*d* to 2*f*).

Several different types of physical devices and systems, and different types of algorithms may be used to estimate the attitude and/or position, or derivatives thereof, of the pointing device.

A first category of such systems uses inertial devices onboard the pointer comprising combinations of one or more of accelerometers (A), gyrometers (G), and of magnetometers (M). The accelerometers and the magnetometers make it possible to measure the orientation of the pointer with respect to a fixed vector field, the gravitational field and the terrestrial magnetic field, respectively. They are however affected by perturbations (inherent acceleration and ambient magnetic perturbations, respectively) which must be corrected. The gyrometers measure the inherent angular velocity of the movements of the pointer. The gyrometers are generally affected by an appreciable temporal drift which must be corrected regularly. These sensors can be Micro Electro Mechanical Systems (MEMS), optionally integrated, or produced in other, non-integrated, technologies. Each type of sensor can comprise one, two or three axes. In certain applications, a single type of sensor (in this case with three axes) can be used, if the perturbations or the temporal drift can be considered to be negligible so that the final data item regarding orientation, necessary for the invention is sufficiently precise, or may be corrected without the use of another type of sensor. Sensor fusion methods may also be used, where at least two types of sensors, AG, MG or AM, or three types of sensors AGM will be used. In an embodiment where accelerometers and gyrometers (AG) are used, the accelerometer may give the orientation in the absence of motion where no proper acceleration of the device may disturb the measurements. The gyrometers may be used to determine the change in orientation with respect to the orientation derived from the accelerometers, for example when the pointing device is moved generating additional acceleration to gravity. AN additional magnetometer may be used for an absoluter reference with respect to the earth's magnetic field.

This shows that these three types of sensors procure complementary information with a view to better estimation of the orientation, notably:

The three-axis version of the gyrometer provides measurements of angular velocity in relation to three DOF (Degrees of Freedom) and makes it possible to estimate the attitude by integrating the angular velocity. It therefore makes it possible to compute a relative orientation with respect to a given orientation. This principle of estimating the orientation is subject to drift because of the integration operation, if the gyrometer is used alone;

The three-axis accelerometer provides the orientation of the device with respect to the gravity vector, but is subject to perturbations when the motions are not quasi-static since it measures at the same time the motion-related acceleration parameters;

The three-axis magnetometer provides the orientation of the device with respect to earth's magnetic field, but is subject to the magnetic perturbations of the environment.

Various algorithms can be used to correct the perturbations and merge the signals of the various types of sensors and estimate the attitude, for example those disclosed by the international application published under the No. WO2010/007160, which may be consulted for further details and is hereby incorporated by reference in its entirety, one of the proprietors of which is the proprietor of the present application. With the help of the systems based on inertial sensors onboard the movable pointer, it is also possible to estimate the trajectory and therefore a position relative to an arbitrary starting point of the pointer.

In addition to the first category which uses inertial devices onboard the pointer to estimate the position, the orientation, or the change in orientation, it is also possible to use other systems, such as those cited herein below:

Optical systems comprising Light Emitting Diodes (LEDs), other infrared markers or sensors; systems of this type are marketed under the CodaMotion™ or Vicon™ brands; in such systems, the algorithmics making it possible to estimate the orientation or change in orientation through the power of the detected signal, the angle of arrival or its phase;

Magnetic systems comprising magnetic sources located outside the pointer, in the environment of the screen, said pointer being instrumented with a magnetometer suited to the magnetic sources; it will be possible to refer to the devices from the companies Ascencion Technology™ or Polhemus™;

Ultrasound systems comprising one or more ultrasound emitters/receivers, the emitter or emitters being embedded onboard the pointer and the receiver being fixed on the screen; the algorithmics making it possible to estimate the orientation or change in orientation by using a correlation and a decorrelation of the sound waves received by the receivers (for example the IS-900 System from Intersense);

Systems using radiofrequency waves comprising one or more radiofrequency wave emitters/receivers, the emitter or emitters being embedded onboard the pointer and the receiver being fixed on or in the neighborhood of the screen or the converse; these emitters/receivers can notably be of the UWB (Ultra Wide Band) type; the algorithmics making it possible to estimate the orientation or change in orientation using a merging of the signals corresponding to the angles of arrival, to the amplitude of the signals received and to their arrival time or to their phase;

Video systems comprising one or more video cameras installed on or in the neighborhood of the screen; the algorithmics making it possible to estimate the orientation or change in orientation using an analysis and a processing of the images of the pointer motion which are extracted by the video cameras.

FIGS. 2a, 2b and 2c represent the principle of determining the displacement parameters or position parameters of a cursor on the basis of the angles of yaw and of pitch of the direction vector carried by a pointer in a reference frame and by using a vertical plane projection surface, according to an embodiment of the invention.

In the figure, it is assumed that the position of the pointer is fixed arbitrarily. In the general case it may nonetheless be variable over time. This illustration corresponds to the case, for example, where an orientation measurement is available without the position measurement. Only the orientation of the movable pointer is measured. The principle set forth remains applicable for a measured variable pointer position not arbitrarily fixed.

In the mode illustrated in FIGS. 2a, 2b and 2c, the position of the cursor on the display surface is computed in the following manner: the intersection is computed of the straight line carried by the vector p (p1, p2 for example) tied to the pointer with the projection surface which is a plane surface here. The direction vector of the straight line is the vector p1, 211 (respectively p2, 212). The intersection of the straight line with the projection surface is indicated by the points 221 and 222 for the two direction vectors p1 and p2 corresponding to two successive orientations of the movable pointer.

Consider for example the rotation matrix R (or the quaternion q) which defines the attitude of the pointer in relation to a frame tied to the earth, which here is taken as reference frame, "Earth Frame". R is provided by the movable pointer orientation measurement device.

Consider the 3D pointer vector, $p=[px\ py\ pz]^T$ with $\|p\|=1$. For the sake of simplification and by convention, it is assumed here that p coincides with the vector x of the frame tied to the pointer, this definition is non-restrictive and may be replaced with another appropriate definition. In relation to the Earth Frame, p is then the first column of the matrix R.

In an absolute mode the position (x,y) may be directly determined by the angles $\phi$ (yaw) and $\theta$ (pitch). In one embodiment, the position (x,y) may be calculated by a formula of the type $(x,y)=(x0+G1*\tan(\phi), y0+G1*\tan(\theta)/\cos(\phi))$, wherein G1 is a constant which depends on the distance between the pointer and the screen, and the scale of x and y, and x0 and y0 are constants which are representative of the position of the cursor when $\phi$ and $\theta$ are both equal to zero. x0 and y0 depend on the distance and/or orientation of the pointer with respect to the screen, and the relative altitude of the pointer and the center of the screen.

In a relative mode the position (x,y) of the pointer may be iteratively calculated by adding variations of the position. Let (Δx,Δy), 231, 232, be the displacement of the point of intersection from 221 to 222 on the projection surface (here a vertical plane) when the pointer is displaced from the orientation p1 to the orientation p2. For the sake of simplification, without restricting the generality, in this example it is assumed that there is an identity transformation between the displacement of the cursor on the display surface, and the displacement of the point of intersection on the projection surface. In general, Δx is horizontal and Δy is in a vertical plane.

In the general case (when the projection surface is not plane), Δx and Δy are not necessarily straight segments but may be curvilinear distances on curve elements (for example, the arc of a circle).

Consider the two angles: ϕ (yaw) and θ (pitch) which are related to p $$\phi = a\,\tan(py/px)]-\pi,\pi[$$

$$\theta = a\,\tan(pz/\text{sqrt}(px2+py2))]-\pi/2,\pi/2[$$

FIGS. 2a, 2b and 2c illustrate the change of position on the surface as a function of an elementary displacement according to the yaw (ϕ1→ϕ2) and according to the pitch (θ1→θ2). ϕ and θ can be determined on the basis of p=[px py pz]$^T$ as indicated above.

It is possible to compute the displacements Δx and Δy through the following formulae:

$$\Delta X = G(\tan(\phi_2) - \tan(\phi_1))$$

$$\Delta Y = G\left(\frac{\tan(\theta_2)}{\cos(\varphi_2)} - \frac{\tan(\theta_2)}{\cos(\varphi_1)}\right)$$

When the yaw or the pitch approach ±π/2 the displacement of the cursor increases in absolute terms and tends to infinity G is a constant which depends on the distance between the pointer and the plane and is therefore related to the arbitrary position given to the pointer. It makes it possible to adjust the proportion between the angular displacement of the pointer and the displacement of the cursor.

In a similar manner the mapping equations for other intermediate surfaces can be deduced, for example, for a cylindrical or spherical intermediate surface. In some embodiments, the user may point the pointing device in a direction p that intersects with the intermediate surface, and at the same time this direction may be pointing away from the actual display surface. This is the case for e.g. a spherical, or a cylindrical, intermediate surface where the user points in the opposite direction of the screen.

FIGS. 2d, 2e and 2f represent the principle of determining the displacement parameters or position parameters of a cursor on the basis of the angles of yaw and of pitch of the direction vector carried by a pointer in a reference frame and by using a small section of an arbitrary projection surface, according to an embodiment of the invention.

The arbitrary surface is approximated for each position/orientation of the pointer by a small plane surface for which FIGS. 2d, 2e and 2f present the principle of determining the position or of displacing the cursor.

To compute the position of the cursor, the intersection is computed of a straight line carried by the vector p with the projection surface. An elementary surface is then considered, defined by the frame $(X_E, Y_E)$, where:

$X_E$ is horizontal (i.e. $X_E$//Plane($X_{Earth}$, $Y_{Earth}$)); this is manifested by the fact that the component along $Z_{Earth}$ is zero, hence $X_E = [\cos(\alpha)\sin(\alpha) 0]^T$;

$Y_E$ is in a vertical plane and perpendicular to $X_E$; this is manifested by the fact that the component along $(X_{Earth}, Y_{Earth})$ is perpendicular to $X_E$, hence $Y_E = [-\cos(\beta)\sin(\alpha)\cos(\beta)\cos(\alpha)-\sin(\beta)]^T$.

For $Y_E$ to be downwards it is necessary that $-\pi/2 < \beta \leq \pi/2$.

It is possible to compute the displacements Δx and Δy, 231d, 232d, with the following formula:

$$\Delta X = \frac{(\vec{n}\cdot\vec{p})\cdot(p_1 \wedge p_2 \cdot Y_E)}{(\vec{n}\cdot p_1)(\vec{n}\cdot p_2)}$$

$$\Delta Y = -\frac{(\vec{n}\cdot\vec{p})\cdot(p_1 \wedge p_2 \cdot X_E)}{(\vec{n}\cdot p_1)(\vec{n}\cdot p_2)}$$

Where:

As indicated above, $p_1$ and $p_2$ are the vectors defined at the two successive orientations of the pointer;

$\vec{n} = X_E \wedge Y_E$ is the vector normal to the pointed-at surface;
$\vec{p} = [\vec{p}_x \vec{p}_y \vec{p}_z]^T$ is a point belonging to this elementary surface (e.g. $\vec{p} = kp_1$);

"∧" and "." represent the vector product and scalar product operators respectively.

By way of exemplary realization of the above principle of arbitrary projection surface, the computations are detailed hereinbelow in the case of a vertical plane projection surface perpendicular to $X_{Earth}$ ($\vec{p} = kp_1$, $\alpha = \pi/2$ and $\beta = \pi/2$), i.e. then $X_E = [0\ 1\ 0]^T$ and $Y_E = [0\ 0\ -1]^T$ $$\Delta X = \frac{G}{p_{x1}p_{x2}}(p_{x1}p_{y2} - p_{x2}p_{y1}) = G(\tan(\varphi_2) - \tan(\varphi_1)),$$

$$p_{x1} > 0 \text{ and } p_{x2} > 0$$

$$\Delta Y = \frac{-G}{p_{x1}p_{x2}}(p_{x1}p_{z2} - p_{x2}p_{z1}) = G\left(\frac{\tan(\theta_2)}{\cos(\varphi_2)} - \frac{\tan(\theta_1)}{\cos(\varphi_1)}\right),$$

$$p_{x1} > 0 \text{ et } p_{x2} > 0$$

We thus obtain the case illustrated by FIGS. 2a, 2b and 2c and the same formulae.

Figure 3A:
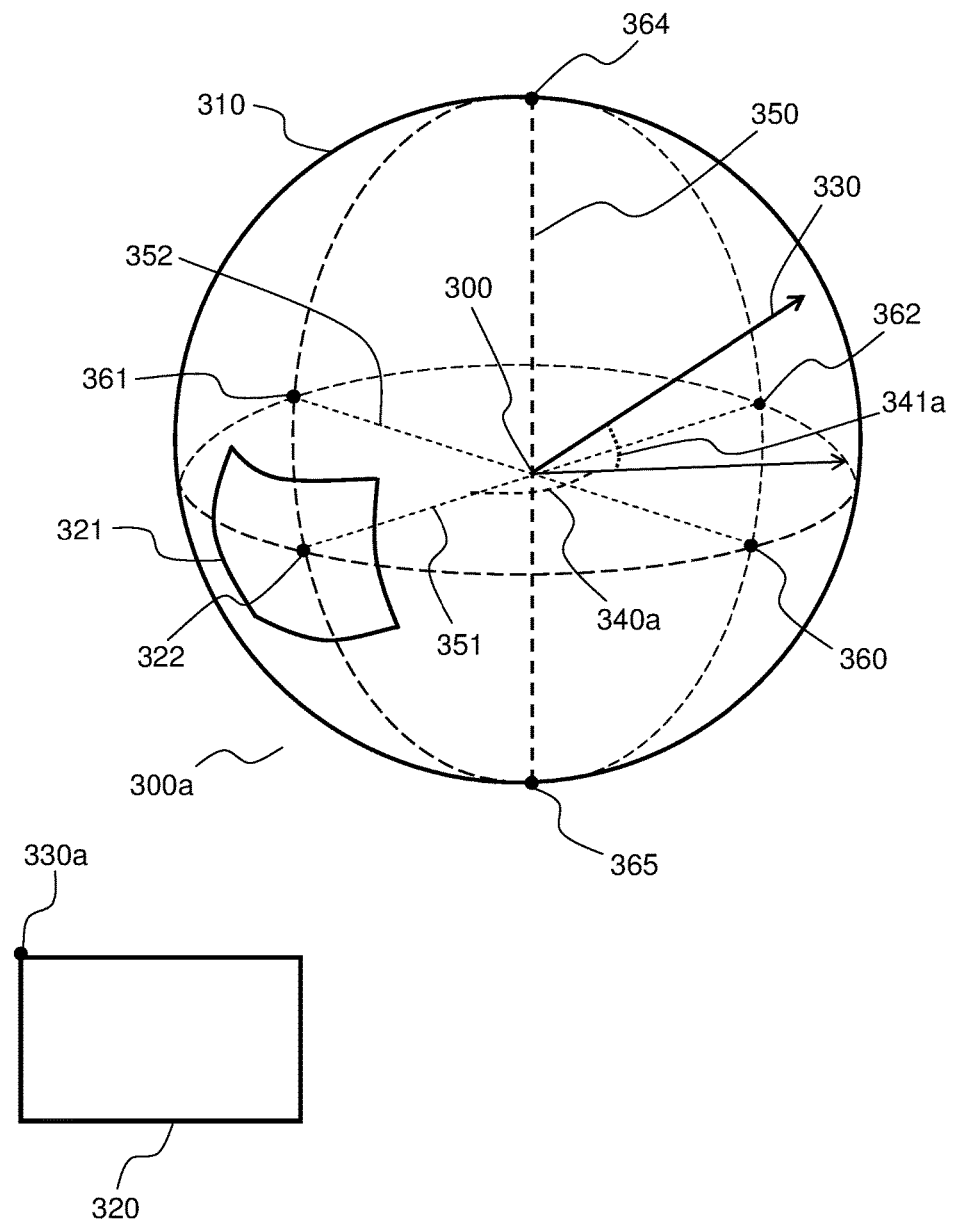
FIGS. 3a and 3b display respectively two ways of referencing the orientation of a device when pointing away from the screen, respectively using two different references for yaw and pitch angles of a pointing devices, according to an embodiment of the invention.
Figure 3B:
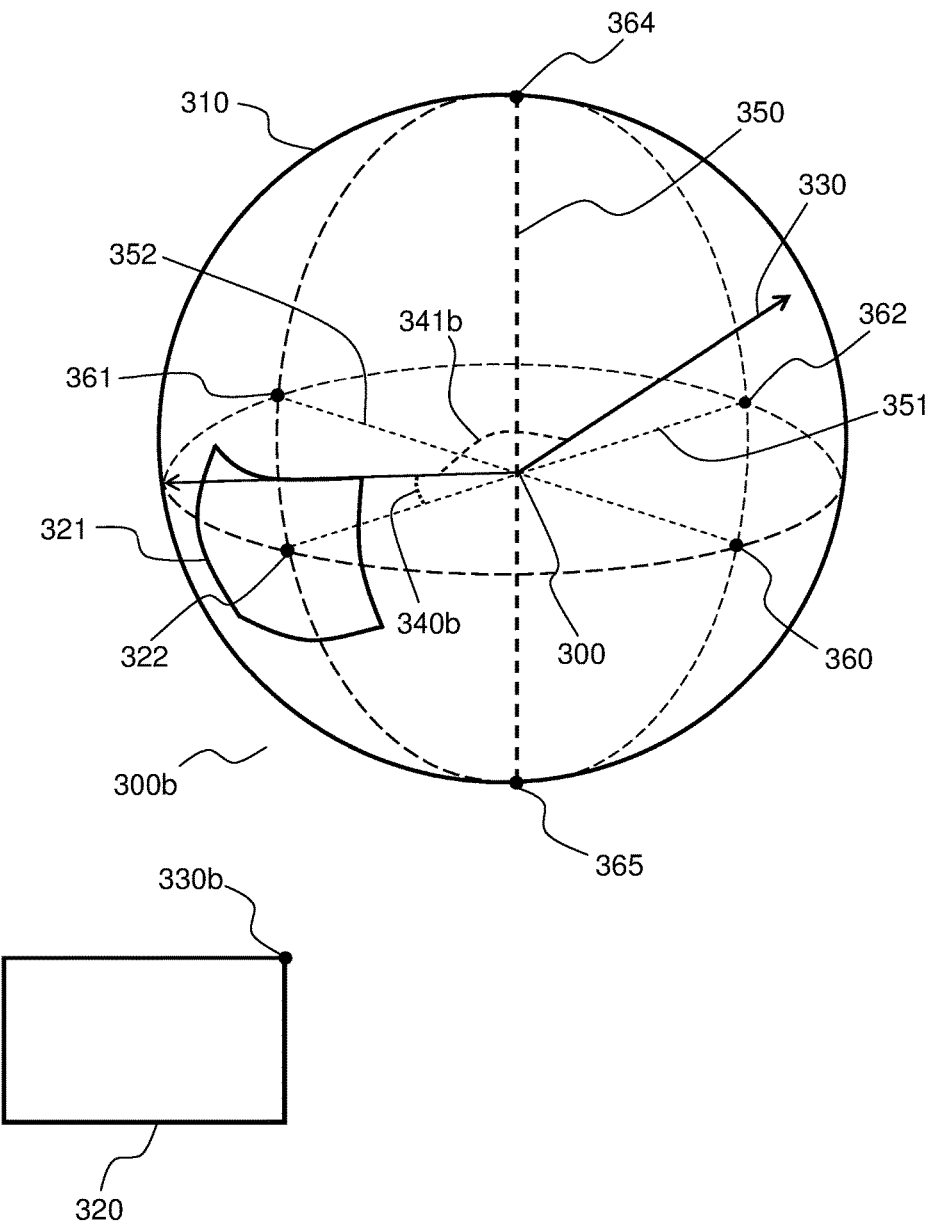

FIGS. 3a and 3b display respectively two ways of referencing the orientation of a device when pointing away from the screen, respectively using two different references for yaw and pitch angles of a pointing devices, according to an embodiment of the invention.

FIG. 3a displays a first way 300a of referencing the orientation of a device pointing away from the screen.

The pointing device 300 is located at the center of a virtual sphere 310. The screen 320 may be represented as a small (projected) section on the sphere 321. A mapping technique may be used where the cursor is shown on the screen when the intersection of the pointing direction coincides with the section of the sphere corresponding to screen 320. When the intersection with the sphere is outside this section, the cursor may be shown at the screen border. The position of the cursor along the screen border depends on the exact pointing direction. Advantage of such an embodiment is that a cursor is shown in the screen or at the border of the screen at all times, no matter where the user is pointing, even if it is away from screen 320.

When the user is pointing in a direction, a virtual point 330 is defined, for example, at the position the pointing direction intersects with the sphere The orientation of the device is defined by a yaw angle 340*a*, and a pitch angle 341*a*.

The yaw and pitch angles are defined around three axis: a vertical axis 350, a first horizontal axis 351, which is defined between the pointing device 300 and the center of the screen 322, and a second horizontal axis 352, which is perpendicular to both the vertical axis 350 and the first horizontal axis 351. In this case the reference orientation with the yaw angle and pitch angle both zero corresponds to the center of the screen. In any predefined reference orientation may be used, for example pointing to a corner of the screen, or even outside the screen. The reference orientation may also be defined by the user, for example, by holding the device in the desired reference orientation and indicating to the system that this is the desired reference orientation, for example by pressing a button.

In a first mode of referencing the orientation of the device, the yaw angle 340*a* varies between $-\pi$ and $\pi$ around the vertical axis 350, and is equal to 0 when the device is pointing to the center of the screen. For example, the yaw angle will be equal to 0 when the pointing device is pointing to point 322, $-\pi/2$ when it is pointing to point 360, $+\pi/2$ when it is pointing to point 361, and $-\pi$ or $+\pi$ when it is pointing to point 362. The pitch angle 341 varies between $-\pi/2$ and $\pi/2$. The pitch angle 341 is equal to 0 when the pointing device is horizontal, pointing, for example, to one of the points 322, 360, 362 or 363, and is equal to $-\pi/2$ when the pointing device is pointing up to the point 364, and $-\pi/2$ when the pointing device is pointing down to point 365. The point 364 can be seen as the "North Pole of the sphere: the pointing device is pointing to point 364 when the pitch angle 362 is $\pi/2$, whatever the value of the yaw angle 340*a*. The point 365 can be seen as the "South Pole" of the sphere: the pointing device is pointing to point 365 when the pitch angle 362 is $-\pi/2$, whatever the value of the yaw angle 340*a*.

FIG. 3*b* displays a second mode 300*b* of referencing the orientation of a device pointing away from the screen in the prior art.

In this second way of referencing the orientation of the device, the yaw angle 340*b* varies between $-\pi/2$ and $-\pi/2$ around the vertical axis 350, and is equal to 0 when the device is pointing to the center of the screen. For example, the yaw angle will be equal to 0 when the pointing device is pointing to point 322, $-\pi/2$ when it is pointing to point 360, $+-\pi/2$ when it is pointing to point 361. The pitch angle 341 varies between $-\pi$ and $\pi$, and is 0 when the pointing device is horizontal. Thus, the points in the half sphere opposite the direction of the screen are pointed to with values of pitch above $\pi/2$ or below $-\pi/2$. For example, when the pointer is pointing to point 362, the yaw angle 340*b* is equal to 0, and the pitch angle 341*b* is equal to $-\pi$ or $\pi$. When the pointer is pointing to point 364, the pitch angle 341*b* is equal to $\pi/2$, whatever the value of the yaw angle 340*b*, and when the pointer is pointing to point 365, the pitch angle 341*b* is equal to $-\pi/2$, whatever the value of the yaw angle 340*b*. The point 361 can be seen as a "West Pole": it is possible to point to point 361 with a yaw angle 340*b* of $+-\pi/2$, and a pitch angle 341*b* of 0, or with a yaw angle 340*b* of $-\pi/2$, and a pitch angle of $-\pi$ or $\pi$. Similarly, the point 360 can be seen as an "East Pole": it is possible to point to point 360 with a yaw angle 340*b* of $-\pi/2$, and a pitch angle 341*b* of 0, or with a yaw angle 340*b* of $+-\pi/2$, and a pitch angle of $-\pi$ or $\pi$.

Whatever the mode of referencing the position of the pointing device, once a yaw and pitch angle of orientation of device are obtained, these angles are converted into a position of a cursor in the screen. If the pointer points into the projection of the screen in the sphere 321, this operation is straightforward because both models are identical. Examples of calculation are given with reference to FIGS. 2*a*, 2*b* and 2*c*. When the pointer is pointing outside the projection of the screen on the sphere 321, the corresponding position of the cursor can be saturated at the border of the screen. When the pointer is pointing in the half-sphere between the pointing device and the screen, the position of the cursor does not depend on the mode of referencing the position or orientation of the device: the angles are identical in the first and the second ways of referencing the position of the device.

On the contrary, when the pointing device is pointing to the half-sphere opposite the direction of the screen, the saturated position of the pointer can be very different depending on the mode of referencing the position of the device: for example, when the pointing device is pointing to point 330, in the first mode of referencing the yaw angle 340*a* is smaller than the minimum yaw angle to remain within the limits of the screen: the position of the cursor will be saturated on the left edge of the screen 330*a* (the screen as seen from the inside of the sphere). On the contrary, when pointing to the point 330 using the second mode of referencing the position of the device, the position of the cursor will be saturated on the right edge of the screen, because the yaw angle 340*b* is above the maximum yaw angle to remain within the limits of the screen. By means of convention, in this application, the spheres will be represented "as viewed from outside", while the flat screens (for example the screen 320) will be represented "as viewed from the inside". This means that the screen 320 represents the screen as seen by a user who holds the pointing device in point 300, thus, the point 330*b* is saturated on the right border of the screen in the second mode of referencing.

Figure 4A:
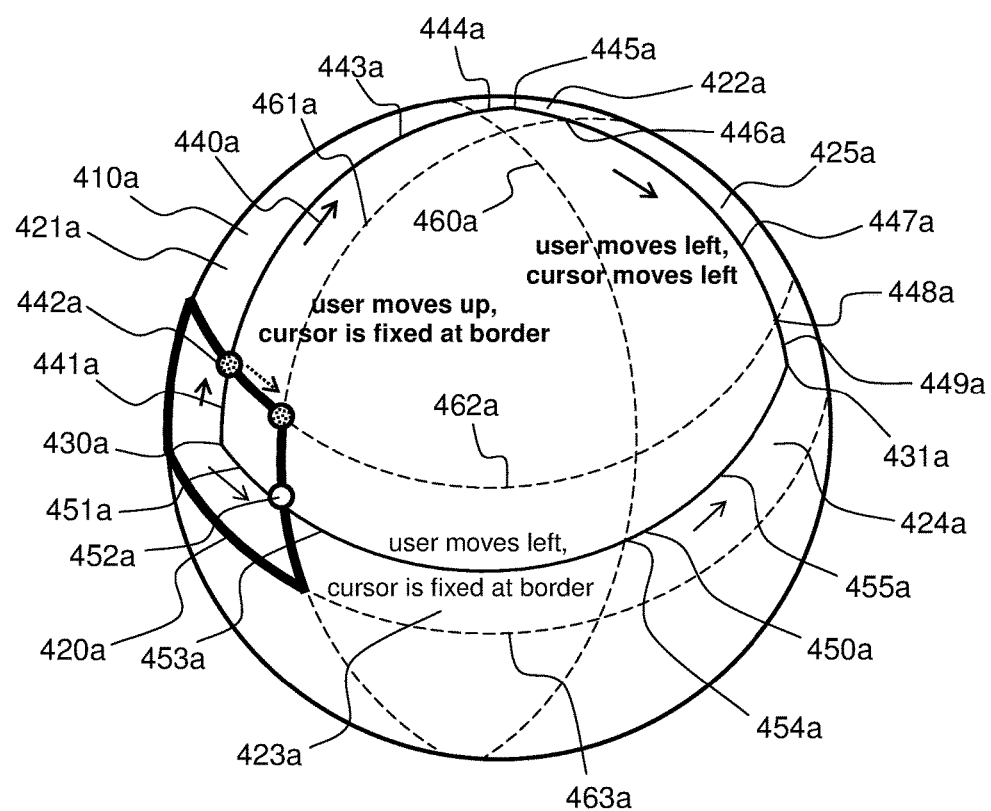
FIGS. 4a and 4b display respectively two different trajectories of a pointing device pointing to a point far away from the screen, and two positions of a virtual object in a screen, respectively using two different ways of calculating yaw and pitch angles, according to an embodiment of the invention.
Figure 4B:
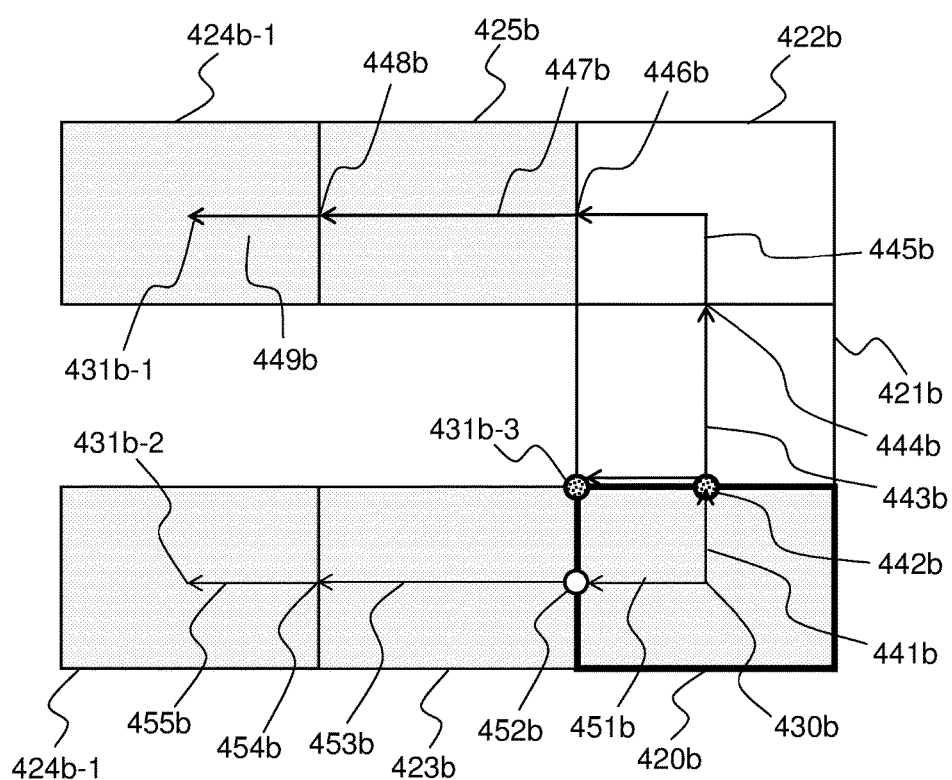

FIGS. 4*a* and 4*b* display respectively two different trajectories of a pointing device pointing to a point far away from the screen, and two positions of a virtual object in a screen, respectively using two different ways of calculating yaw and pitch angles, according to an embodiment of the invention.

FIG. 4*a* displays two different trajectories of a pointing device pointing to a point far away from the screen, in a sphere 410*a* similar to the spheres 310 displayed in FIGS. 3*a* and 3*b*. A pointing device is located in the center of the sphere 410*a*, and moves from the point 430*a* in the center of the screen 420*a* to another point 431*a*, following two trajectories 440*a* and 450*a*.

The sphere is divided into several zones by virtual lines. Virtual line 460*a* separates the half sphere between the pointer and the screen and the half sphere opposite to the screen. Virtual line 461*a* is an extension of the left side of the screen into the rest of the sphere. The lines 462*a* and 463*a* are extensions of the top and bottom sides of the screen into the rest of the sphere.

These lines separate the screen into a number of different zones. Among them, in addition to the screen 420*a*, the band 421*a* which represents the vertical extension of the screen above it, above the screen and in the half sphere between the pointing device and the screen (front half), the band 422*a* represents the vertical extension of the screen, in the half sphere opposite to the screen (back half). The band 423*a* represents the horizontal extension of the screen, to the left of the screen (as viewed from the pointing device), in the half sphere between the screen and the pointing device (front half), and the band 424a represents the horizontal extension of the screen, in the half sphere opposite the screen (back half). The zone 425a is an intermediary zone, in the half sphere opposite the screen, between the bands 422a and 424a.

Trajectory 440a is followed by a user who, while initially pointing to the center of the screen, starts pointing upwards within the screen 441a, reaches the top side of the screen 442a, then keeps moving up 443a, until pointing upwards 444a. The user then continues his/her movement into the band 422a: he/she keeps moving in the direction opposite the screen, then starts pointing to the left 445a. It is important to note that this movement appears to be directed to the right in the figure, but is actually a movement of the pointing device to the left with respect to the user, since the user and the pointing device are in the center of the sphere. The pointing device then starts pointing 446a in the intermediary zone 425a. The user points downwards on his/her left 447a, enters 448a in the band 424a, continues his/her movement down 449a, and reaches the point 431a.

The trajectory 450a is followed by a user who, while initially pointing to the center of the screen, starts pointing leftwards 451a, reaches the left border of the screen 452a, keeps pointing leftwards 453a, until pointing leftwards, perpendicularly to the direction of the screen 454a (back half). Then the user continues rotating the device, and points leftwards in the direction opposite the screen, until pointing to point 431a.

FIG. 4b displays two positions of a virtual object in a screen, respectively using two different ways of calculating yaw and pitch angles. It also displays the two corresponding trajectories, which represent the trajectories of a cursor in the screen, commanded by the two trajectories of the pointer in the air in FIG. 4a.

The screen 420b represents the screen as seen from the center of the sphere, while the rectangles 421b, 422b, 425b, 423b represent virtual extensions of the screen, which correspond respectively to areas 421a, 224a, 425a, and 423a of the sphere. The area 424a is represented by two different virtual extensions, 424b-1 when the pointer is coming from area 425a, and 424b-2 when the pointer is coming from area 423a. The center of the screen is represented by point 430b. The trajectory of the cursor, which corresponds to the first trajectory 440a in the sphere, is represented by the sequence of arrows and positions 441b, 442b, 443b, 444b, 445b, 446b, 447b, 448b, 449b, 431b-1, which correspond respectively to 441a, 4442a, 443a, 444a, 445a, 446a, 447a, 448a, 449a, 431a. The trajectory of the cursor, which corresponds to the second trajectory 450a in the sphere, is represented by a sequence of arrows and positions comprising references 451b, 452b, 453b, 454b, 455b, 431b-2, which correspond respectively to positions 451a, 452a, 453a, 454a, 455a, 431a.

It is not possible to show the object, i.e. the cursor, outside the limits of the screen 420b. Thus, when a user follows the first and the second trajectories in the air, the position of the cursor is saturated at the borders of the screen.

In prior art methods, it is not possible to choose alternatively one of the two modes 300a and 300b to reference the position of the cursor, depending on which mode yields the best, most logical and intuitive results for the user. For example, when a user of the pointing device follows a trajectory 450a, the mode of referencing 300a may be used: when the pointing device keeps pointing within the screen 451a, the cursor progressively shifts from the center of the screen to the edge of the screen 452b. When the pointing device points outside the screen 453a, 454a, 455a, going left and increasing the negative yaw angle, the position of the cursor remains in 452b. The behavior of the cursor corresponds to the movement of the user who makes a rotation to the left.

On the other hand, when the user of the pointing device follows trajectory 440a, the mode of referencing the position of the pointing device 300b may be used: when the pointing device keeps pointing within the screen 441a, the cursor progressively shifts from the center of the screen to the edge of the screen 442b. When the pointing device points outside the screen 443a, 444a, 445a, the pitch angle is large, and the yaw angle equal to zero: the position of the cursor remains in 442b. When the user starts to point leftwards and downwards 445a, 446a, the yaw angle becomes more negative, and the position of the cursor progressively shifts to the left and reaches the top-left angle of the screen 431b-3. When the pointing device keeps pointing leftwards and downwards 447a, 448a, 449a, the position of the cursor remains in 431b-3. Also in this case the behavior of the cursor corresponds to the movement of the user who first moves upwards and then makes a rotation to the left These examples demonstrate that, depending on the type of movement of the user, a certain mode of representing the yaw and pitch angles must be choose in order to obtain the best, most logical and intuitive movement of the cursor that corresponds to the motion of the pointing device.

Figure 5A:
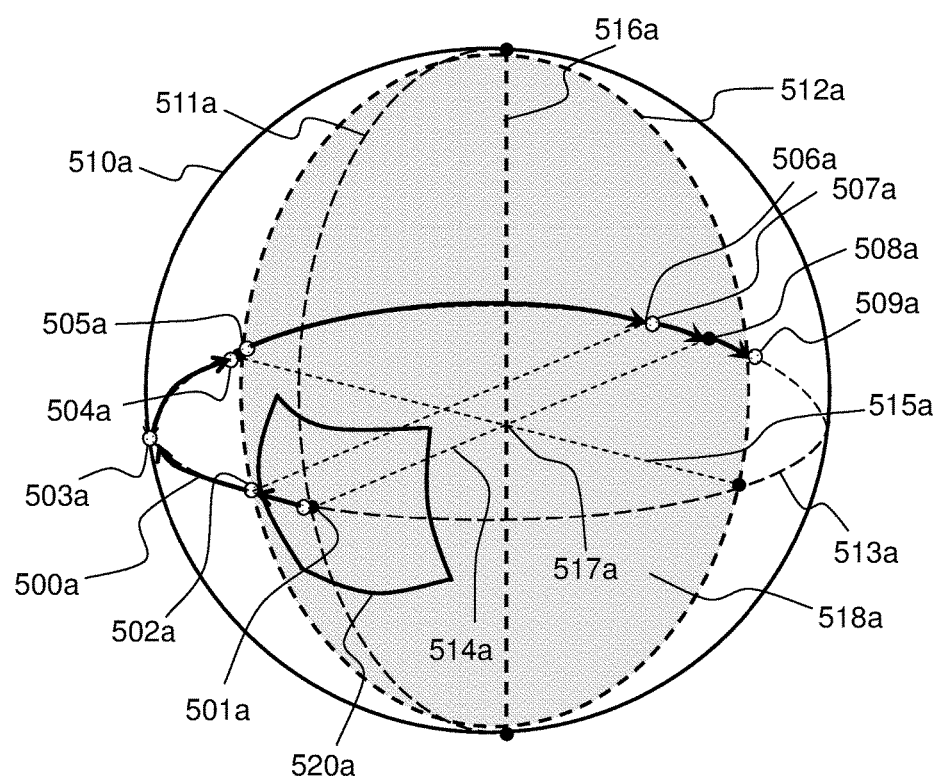
FIGS. 5a, 5b and 5c respectively display a trajectory of a pointing device in space, the corresponding trajectory of a virtual object in a finite screen using a first way of calculating yaw and pitch angles in prior art, and the corresponding trajectory of a virtual object in a finite screen using a second way of calculating yaw and pitch angles, according to an embodiment of the invention.
Figure 5B:
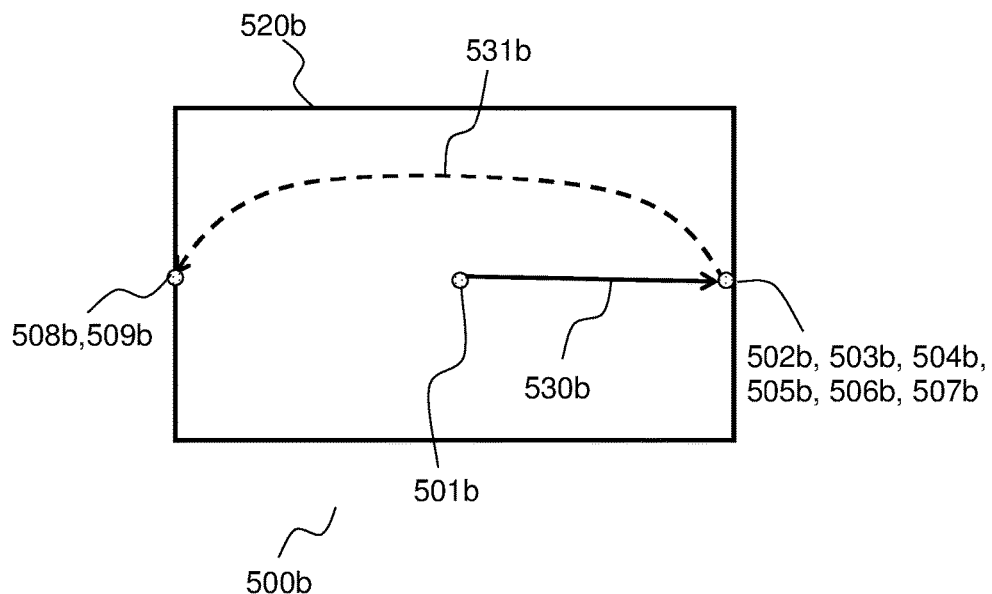
Figure 5C:
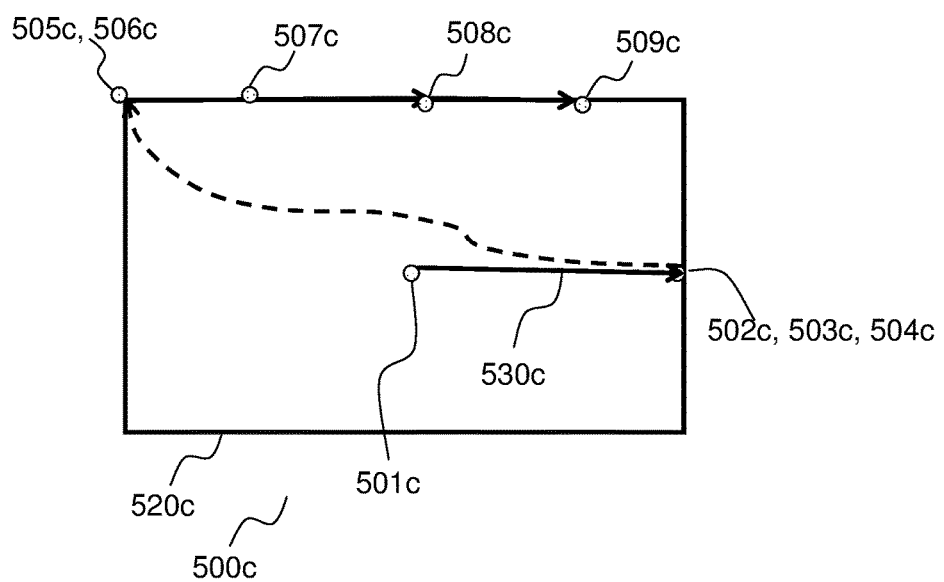

FIGS. 5a, 5b and 5c respectively display a trajectory of a pointing device in space, the corresponding trajectory of a virtual object in a finite screen using a first way of calculating yaw and pitch angles in prior art, and the corresponding trajectory of a virtual object in a finite screen using a second way of calculating yaw and pitch angles, according to an embodiment of the invention.

Trajectory 500a is followed by a pointing device located in the center 517a of a virtual sphere 510a. A virtual screen 520a is displayed, which corresponds to a projection on the sphere of the screen to which the pointing device is pointing. Each one of the meridian circles 511a, 512a, 513a separates the sphere in two halves:

Meridian circle 511a contains the center of the screen 501a, which separates the sphere between a "left" half and a "right" half;

Meridian circle 512a, which is a vertical meridian circle parallel to the screen, and separates the sphere into a "front" half, between the pointing device and the screen, and a "back" half, which is the half sphere at the back of the user when he is facing the screen;

Equatorial circle 513a, which is the horizontal circle passing through the center of the sphere, separates the sphere between a "top" half and a "bottom" half.

The sphere 510a is also crossed by three axis that intersect at the center of the sphere 517a:

A first axis 514a, which is a horizontal axis comprising the center 501a of the screen;

A second axis 515a, which is an horizontal axis perpendicular to the first axis 514a;

A third axis 516a, which is a vertical axis;

The second axis 515a, and the third axis 516a define a plane 518a, which separates the sphere into the "front" half and the "back" half.

The user of the pointing device follows a horizontal trajectory, from the center of the screen to its right. The user follows a rotation covering a bit more than a horizontal half circle. He/she starts pointing to the center 501a of the screen, then points horizontally to the right, to the edge of the screen at point 502*a*, then keeps pointing the right and reaches the point 503*a*, and leaves the "front" half to enter the "back" half 504*a*, 505*a*. Points 504*a* and 505*a* represent the limits of the "front" half and the "back" half in the horizontal equatorial circle. Point 504*a* corresponds to the limit, while being in the "front" half, and point 505*a* corresponds to the limit, while being in the "back" half. Once he/she starts pointing to the "back" half the user keeps pointing to the right, and continues the rotation, in the "right" half, before reaching point 506*a* opposite the center of the screen, and leaving the "right" half to enter the "left" half. He/she then continues his/her trajectory to the right in the "left" half to reach point 506*a*, which is symmetrical to point 502*a* in relation to plane 518*a*. He/she then continues to points 507*a* and 508*a* which are the opposite points in the sphere of the center 501*a*. Similarly to points 504*a* and 505*a*, points 506*a* and 507*a* represent the limits of the "right" half and the "left" half, point 506*a* being in the "right" half and point 507*a* being in the "left" half of the sphere. After starting to point to the "left" half of the sphere, the user keeps turning right until pointing to point 509*a*.

The whole trajectory is followed horizontally around the horizontal equatorial circle 513*a*. At any time, the user can point just above or just below the horizontal equatorial circle 513*a*, i.e. using low pitch angles.

FIG. 5*b* displays the corresponding trajectory 500*b* of a virtual object in a finite screen 520*b* using a first mode of calculating yaw and pitch angles. This first way corresponds to the first way 300*a* of calculating yaw and pitch angles depicted in FIG. 3*a*.

Points 501*b*, 502*b*, 503*b*, 504*b*, 505*b*, 506*b*, 507*a*, 508*b* and 509*b* are the points where a cursor is displayed, when the pointing device points to points 501*a*, 502*a*, 503*a*, 504*a*, 505*a*, 506*a*, 507*a*, 508*a* and 509*a* respectively. When the pointing device points within the screen 520*a*, from point 501*a* to point 502*a*, the cursor is affected by a progressive trajectory 530*b* from point 501*b* to point 502*b* in the screen. When the pointing device points outside the screen in the "right" halve, for example when it is pointing to points 502*a*, 503*a*, 504*a*, 505*a*, 506*a* or 507*a*, the yaw angle, which corresponds to angle 340*a*, will be lower than the minimum yaw angle to remain within the borders of the screen. Thus, the position of the cursor remains saturated at points 502*b*, 503*b*, 504*b*, 505*b*, 506*b*, 507*b* at the edge of the screen.

When the pointing device starts pointing into the "left" half of the sphere, between points 507*a* and 508*a*, the yaw angle as defined in 340*a* switches, at point 508*a*, from a value of +π to a value of −π, then decreases progressively. When the yaw angle is negative with a large absolute value of yaw angle, for example when it is equal to −π, the position of the cursor is saturated at the left edge of the screen 520*b*. In this example, it would be saturated at point 508*b*, 509*b*. Thus, when the user performs a complete rotation while pointing horizontally, there will be a jump 531*b* of the position of the cursor in the screen 520*b* if the first mode of calculating yaw and pitch is used. Instead of a jump, the cursor can also be moved quickly around the edge of the screen to obtain the desired position.

FIG. 5*c* displays the corresponding trajectory 500*c* of a virtual object in a finite screen 520*c* using a second mode of calculating yaw and pitch angles. This second way corresponds to the second way 300*b* of calculating yaw and pitch angles depicted in FIG. 3*b*.

Points 501*c*, 502*c*, 503*c*, 504*c*, 505*c*, 506*c*, 507*c*, 508*c* and 509*c* are the points where a cursor is displayed, when the pointing device points to points 501*a*, 502*a*, 503*a*, 504*a*, 505*a*, 506*a*, 507*a*, 508*a* and 509*a* respectively. When the pointing device points within the screen 502*a*, from point 501*a* to point 502*a*, the cursor is affected by a progressive trajectory 530*c* from point 501*c* to point 502*c* in the screen. When the pointing device points outside the screen in the "right" halve, for example when it is pointing to points 502*a*, 503*a*, 504*a*, the yaw angle, which corresponds to angle 340*b*, will be smaller than the minimum yaw angle to remain within the borders of the screen. Thus, the position of the cursor remains saturated in points 502*c*, 503*c*, 504*c* at the edge of the screen.

When the user starts pointing in the "back" half sphere to point 505*a*, according to the second way 300*b* of calculating yaw and pitch angles, the yaw angle is equal to −π/2 and the pitch angle to +7 or −π. This means that the yaw angle switches from close to +π/2 for point 504*a* to close to −π/2 for point 505*a*. In addition, the pitch angle switches from close to 0 for point 504*a* to close to −π or +π for point 505*a*. As a result 505*c* will be saturated into the upper left corner of the display. The switch from point 504*c* to point 505*c* therefore leads to a diagonal jump of the cursor. Between point 505*a* and point 507*a*, the yaw angle varies from −π/2 to 0. The pitch angle is around +π if the user is pointing just above the horizontal, and just below −π if the user is pointing just below the horizontal. If the user is pointing just above the horizontal, the position of the cursor on the screen 500*c* will, when the user is moving from point 505*a* to point 506*a*, the cursor remains at the corner, point 505*c*/506*c*. Then when the user starts pointing to point 506*a* until he/she reaches point 507*a*, the cursor starts moving from the left to the right at the top edge of the screen from 506*c* to 507*c*. Contrary to the trajectory 500*b*, there is no jump between point 507*c* and point 508*c*, because there is no jump of yaw angle. When the user keeps rotating, pointing from point 508*a* to 509*a*, the cursor keeps moving left from point 508*c* to point 509*c*

It is possible that small movements of the pointing device upwards and downwards lead to pointing alternatively just above or just below the horizontal. If so, the pitch angle switches from +π to −π, or −π to +π, but the yaw angle does not change. Thus, the position of the cursor can jump between the top edge and the bottom edge of the screen 500*c*. However, the cursor continues to go right, either on the top or on the bottom edge of the screen. Thus the user always has a feedback of a cursor which advances on the screen in the correct direction. A hysteresis may be set to avoid frequent jumping of the cursor when the user rotation with a pitch (or yaw) angle close to 0. For example, when the pitch changes sign there should be a significant enough change in pitch before making the cursor jump on the screen.

The example of FIG. 5 shows that the first mode 300*a* and the second mode 300*b* of calculating yaw and pitch angles result in different cursor behavior on the screen. This difference is limited to when the use points to the back half of the sphere. Both methods may result in cursor jumps, but the nature of the jumps may be different. Keeping in mind that the user makes a horizontal rotation, FIG. 5*b* based on first mode 300*a* shows a cursor behavior that remains within the horizontal middle of the screen, with horizontal jumps. FIG. 5*c* shows a diagonal jump which means that there is a sudden increase in the vertical direction on the screen when the cursor jumps to the top (or bottom) edge. This may be less intuitive to the user since he or she has only been making a horizontal motion. Therefore, for the horizontal motion depicted in FIG. 5*a*, the first mode 300*a* is most suited.

A similar analysis may be applied when the user makes a most vertical rotational motion, where the user starts from the middle of the screen and rotates upward, increasing the pitch, and continuing this motion across the 'North pole' and then descending along the back half of the sphere. Applying the different modes to this motion would yield similar figures to FIGS. 5b and 5c, but then in a vertical direction. However, for this motion, second model 300b would result in a behavior as shown in FIG. 5b with only vertical motion and jumps, as is expected and logical. On the other hand, the first model 300a would result in behavior similar to FIG. 5c, where in addition to the expected and logical vertical motion and jumps, unexpected and unintuitive horizontal jumps occur. For this type of motion, the second model 300b would yield the best and most intuitive cursor behavior.

These discussions of the examples show that depending on the type of motion the user makes with the pointing device, a different mode for calculating the yaw and pitches angles may need to be selected in order to provide the most logical and intuitive cursor behavior to the user. Thus, prior art techniques describing ways of calculating yaw and pitch angles and which do not take into account the motion of the user may not be suitable in all use cases. The advantage of the methods presented here is that the best mode is selected as a function of the motion of the user giving optimal results. This advantage is most relevant when the user points away from the screen as in the back half of the sphere.

The method presented here thus selects the most appropriate mode of calculating yaw and/or pitch depending on the motion of the pointing device. The appropriate mode that is selected may depends on selection criteria that are defined to characterize the cursor or pointing behavior. An example of these criteria may be to have the smallest possible jumps, or to only allow jump in the direction of movement of the pointing device. In one example embodiment the system may select the mode that yields cursor jumps in the direction closest to the direction of motion of the pointing device. In another embodiment, the system may select the mode that yields the smallest possible cursor jumps. Applying both these example embodiment to the examples discussed above (e.g. FIGS. 5b and 5c), would yield the correct selection of the appropriate mode.

The mode selection process may be performed based on the cursor position, for example at each update of a new cursor position. In this case, the current cursor position based on a previously selected mode will be compared to a new candidate cursor positions for the different available modes. Here, the new candidate cursor positions are deduced from the motion of the pointing device. For example, the x and y cursor coordinates of the previous cursor position (currently shown on the screen), may be compared to the x and y coordinates of a first cursor position candidate based on a first mode, and to the x and y coordinates of a second cursor position candidate based on a second mode. The difference between the previous cursor coordinates and the coordinates of the candidates may be determined, and the candidate mode that yields the smallest difference may be selected.

Figure 6:
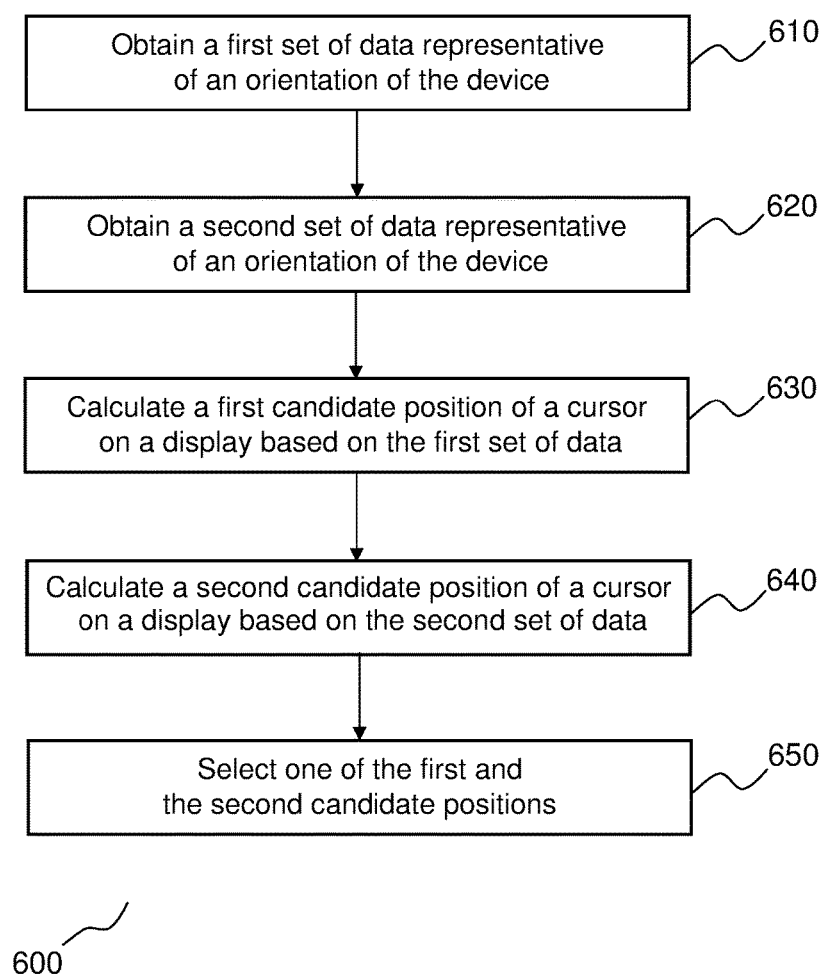
FIG. 6 displays a method for calculating a position of a virtual object in a finite screen according to an embodiment of the invention.

FIG. 6 displays a method for calculating a position of a virtual object in a finite screen according to an embodiment of the invention.

Method 600 aims to display a cursor on a screen using a pointing device, and is especially well-suited when the device is pointing far away from the screen.

The method 600 comprises a first step 610 to obtain a first set of data representative of an orientation of the device. According to various embodiments of the invention, this first set of data can be a first yaw angle and a first pitch angle representative of the orientation of the device, a derivative thereof, or more generally data issued from sensors which may be used to calculate or retrieve a first yaw angle and a first pitch angle of the device. Examples of calculation of a yaw and pitch angles of a device are for example disclosed by with reference to FIG. 1. In a number of embodiments of the invention, the first set of data also comprises a roll angle. According to various embodiments of the invention, the yaw and pitch angles are roll-compensated, with or without calculation of the roll angle of the device.

Method 600 comprises a second step 620 to obtain a second set of data representative of an orientation of the device. Similarly to the first set of data, this second set of data can be a second yaw angle and a second pitch angle representative of the orientation of the device, a derivative thereof, or more generally data issued from sensors which may be used to calculate or retrieve a second yaw angle and a second pitch angle of the device. In a number of embodiments of the invention, the second set of data also comprises a roll angle. According to various embodiments of the invention, the yaw and pitch angles are roll-compensated, with or without calculation of the roll angle of the device. The first set of data and the second set of data are not identical.

In a number of embodiments of the invention, at least one of the first yaw angle and first pitch angle, and at least of the second yaw angle and second pitch angle differ in that they are calculated in different modes. For example, the first yaw angle and the first pitch angle can be expressed using the first mode 300a of referencing the orientation of the device, and the second yaw angle and the second pitch angle may be expressed using the second mode 300b of referencing the orientation of the device.

In a number of embodiments of the invention, method 600 comprises a step 630 to calculate a first candidate position of a cursor on a display based on the first set of data. The term cursor may be understood generically, the cursor can be of any type, size etc. . . . . It can have either a fixed or variable size. The screen can be a flat or curved screen. In the invention, the cursor is displayed in the screen. When the user is pointing outside the screen, the cursor may be displayed either at the edge of the screen or at a certain predefined margin within the screen.

Step 630 consists in converting the yaw and pitch angles of the device into a position of the cursor in the screen. When the user is pointing within the screen, this operation is straightforward, and can be performed for example by using the formulas provided with reference to FIGS. 2a, 2b, 2c. When the user is pointing outside the screen, although pointing in the half space between the user and the screen, the position of the cursor is saturated at the edges of the screen, or at a margin inside the edges of the screen: for example, it is possible to apply the equations above and, if one of the horizontal or vertical positions of the cursor which is obtained is outside the screen, limit the value of horizontal or vertical position of the cursor to the corresponding minimum or maximum value. In this case, an intermediate position may be determined that corresponds to the pointing direction of the device. Then the position of the cursor on the screen is determined based on this intermediate position. For example, if the intermediate position is within the screen, the position of the cursor can be the intermediate position. If the intermediate position is outside the screen, the position of the cursor can be obtained by projecting the intermediate position towards the screen.

Examples of this technique may be found in European patent application EP 2887184, which may be consulted for further details and is hereby incorporated by reference in its entirety.

When the user is pointing in the half space opposite the screen, the position of the cursor depends on the mode of referencing the orientation of the device. The position of the cursor calculated in step 630 using a first set of data representing the orientation, may differ from the position of the cursor calculated using a second set of data representing the orientation.

Method 600 further comprises a step 640 to calculate a second candidate position of the cursor on the display based on the second set of data. This step is similar to step 630, except that a different mode of referencing the orientation of the device is used. For example, if the first mode 300a of referencing the orientation of the device is used at step 630, the second mode 300b of referencing the orientation of the device may be used at step 640. Similarly to step 630, in a number of embodiments of the invention the step 640 comprises calculating a second intermediate position, then calculating the second position based on the second intermediate position.

Method 600 further comprises a step 650 to select one of the first candidate position and the second candidate position to display the cursor. In a number of embodiments of the invention this choice is based at least on a comparison of the first candidate position and the second candidate position with a third position. The selection may be based, for example, on criteria to display the cursor at the most relevant, logical, or intuitive location.

In a number of embodiments of the invention, the third position is a previously displayed position, and step 650 consists in selecting the position amongst the first and the second candidate positions, which is the closest to the previously displayed position. For example, the position of the cursor can be updated regularly at different time steps, and, at each time step, the candidate position which is the closest to the position displayed at the preceding time step is selected. Many different ways exist to calculate the differences between two positions. For example, the positions may be expressed in a (x, y) reference frame, as described for example in FIGS. 2a and 2d. Thus, the difference between two positions can be an arithmetic distance expressed in the unit of the frame of reference. In other examples, the positions are expressed in by the position ($p_x$, $p_y$) of a pixel at which this position is displayed. The position ($p_x$, $p_y$) of a pixel can be expressed for example as a number of horizontal and vertical pixels from an origin pixel. Thus, the difference between a position ($p_{1x}$, $p_{2y}$) and a position ($p_{2x}$, $p_{2y}$) can $$\sqrt{(p_{1x} - p_{2x})^2 + (p_{1y} - p_{2y})^2}.$$

be for example: Any type of norm may be used to determine the differences or distances. In addition, the difference may also be expressed as an angle between two orientations.

In another embodiment of the invention, step 650 predicts a variation of position of the cursor based on a variation of yaw and pitch angle of the device, then selects the candidate position whose difference with a previously displayed position best matches the variation of the position of the cursor.

In other embodiments of the invention, the third position is a position at which the virtual object reached the screen. For example, referring back to FIGS. 3a and 3b which display two different ways of referencing the orientation of a device, when each candidate corresponds to a way of referencing the orientation of a device, a candidate may be selected based on the motion of the pointing device. If the first candidate refers to the way of referencing the orientation of the device as presented in FIG. 3a, and the second candidate refers to the way of referencing the orientation of the device as presented in FIG. 3b, the first candidate may be selected if the user left the screen on the side borders of the screen, and the second candidate may be selected when the user left the screen on the top or bottom borders of the screen. Thus, the selection of the first and second position is, in some embodiments, performed solely based on a position where the virtual object left the screen. In other embodiments of the invention, the step 650 consists in performing a difference between the first candidate position and the third position; performing a difference between the second candidate position and the third position; selecting one of the first and a second position, which is associated with the smallest difference.

In yet other embodiments of the invention, one of the different ways of referencing the orientation of a device is selected at the time when the user leaves the screen, using the criteria described above. In these embodiments of the invention this selection process may be implicit and may not require the calculation of a first and second candidate position. For example, referring back to FIGS. 3a and 3b which display two different ways of referencing the orientation of a device, when each candidate corresponds to a way of referencing the orientation of a device, a candidate may be implicitly be selected based on the motion of the pointing device. If the first candidate refers to the way of referencing the orientation of the device as presented in FIG. 3a, and the second candidate refers to the way of referencing the orientation of the device as presented in FIG. 3b, the first candidate may be selected when the user leaves the screen on the side borders of the screen, and the second candidate may be selected when the user leaves the screen on the top or bottom borders of the screen. In this case, only one of the first or second data set needs to be obtained and only of the first or second candidate positions needs to be calculated because the selection process is determined by the position where the user leaves the screen. Thus, in these embodiments, when a user is pointing outside the screen, an information relative to the position or edge at which the virtual object reached the limits of the screen is stored, and, based on this information, only one of the first and the second candidate positions is calculated as the position of the virtual object.

That can be done by receiving the motion signals, applying a transformation of the motion signals into a set of data representative of at least the orientation of the device, and calculating the position of the virtual object based on the set of data, if the transformation is selected amongst a first and an second transformations of the motion signals into a set of data representative of at least the orientation of the device, in the first and the second way of referencing the orientation of the device. Thus, the choice is performed by choosing the way of referencing the orientation of the device directly, and the calculation of a position of the virtual object based on an orientation of the device is performed once. In a number of embodiments, the motion signals can be received directly in one of the first way or the second of referencing the orientation of the device, and one of the first or the second transformations can be an identity transformation. In a number of embodiments of the invention, a transformation defines either a rotation, or conditions to transform angles from a way of referencing to another, for example a transformation can consist in transforming an angle expressed in the first way of referencing the orientation of the device 300a into the second way of referencing the orientation of the device 300b.

More specifically, the method can be initialized with a first way of referencing the orientation of the device, and it can be determined, when the virtual object is within the display and reaches the limits of the display, an edge at which the virtual object reaches the limits of the display. Based on the edge at which the virtual object reached the limits of the display, one of the first or the second candidate transformations is selected for future calculations of the position of the virtual object. For example, the first candidate transformation can be selected if the virtual object reached the limits of the display at the right or the left edge of the display, and the second candidate transformation can be selected if the virtual object reached the limits of the display at the top or the bottom edge of the display.

The invention also relates to a processing logic configured to execute a method 600 according to the invention. This processing logic may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. The processing logic may be, when instructions are loaded, to execute the steps of a method according to the invention. The processing logic can be embedded within the pointing device, or in a device in communication with the pointing device, or distributed over the different devices. Some examples of embodiments of a system according to the invention are provided with reference to FIGS. 7a, 7b, and 7c.

Figure 7A:
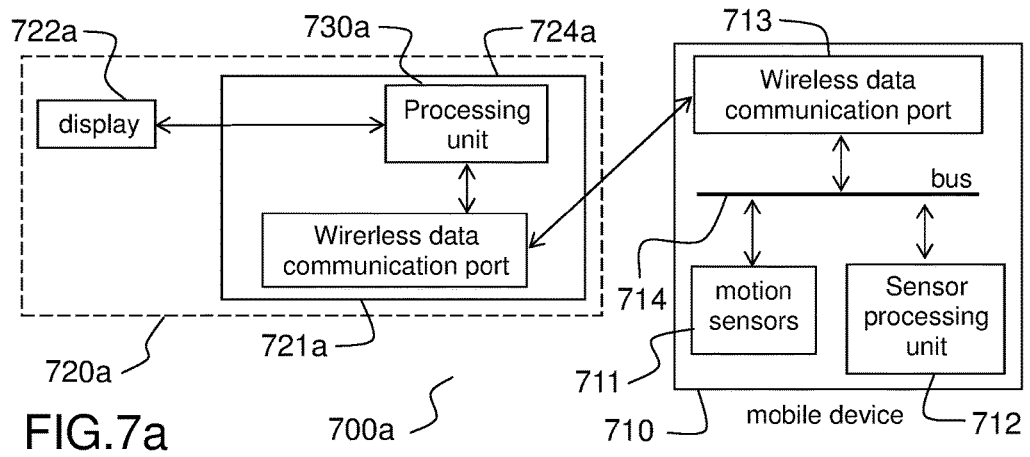
FIGS. 7a, 7b and 7c display three exemplary embodiments of a system for calculating a position of a virtual object in a finite screen according to an embodiment of the invention.
Figure 7B:
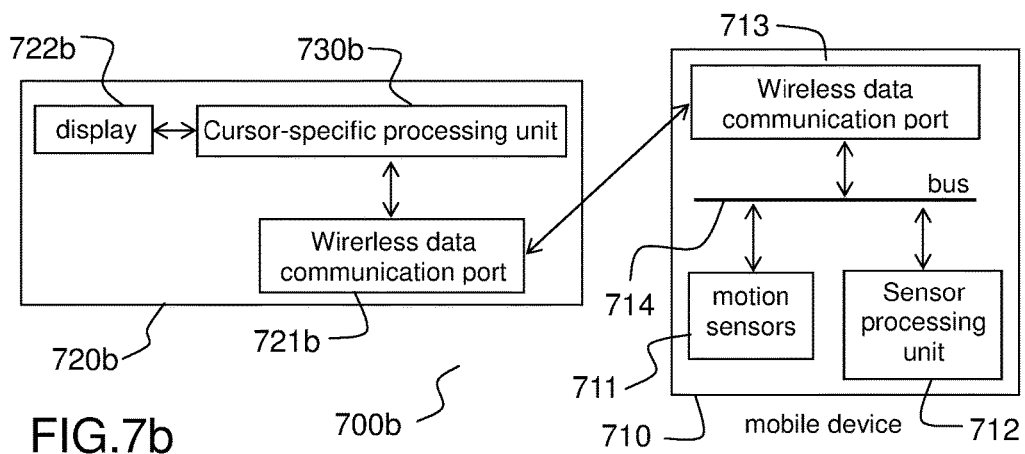
Figure 7C:
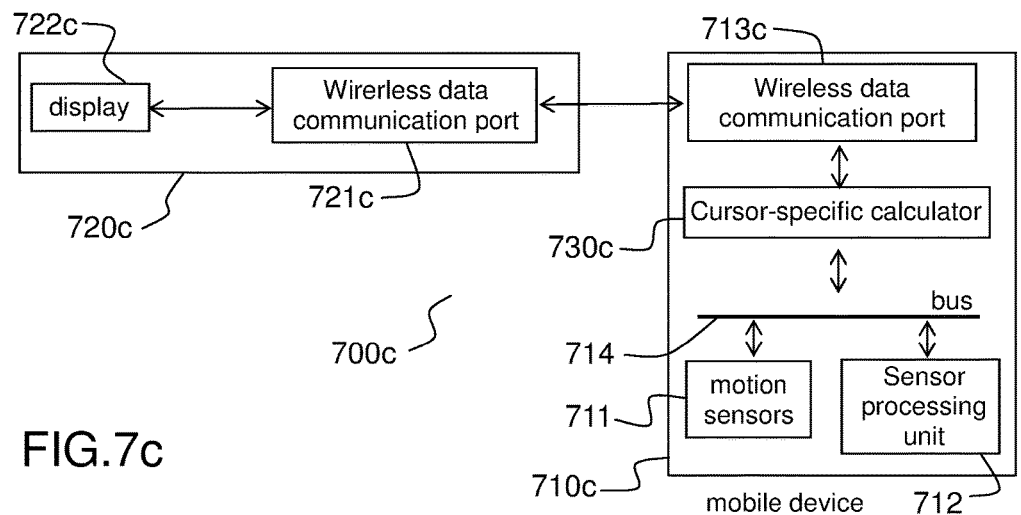

FIGS. 7a, 7b and 7c display three exemplary embodiments of a system for calculating a position of a virtual object in a finite screen according to an embodiment of the invention.

FIG. 7a displays a first exemplary embodiment of a system for calculating a position of a virtual object in a finite screen according to the invention. The system 700a comprises a mobile device 710 in communication with a display system 720a. The mobile device, or pointing device, comprises motion sensors 711 that provide signals representative of the orientation and/or or a variation of the orientation and/or position of the mobile device 711. For example, these sensors may include accelerometers, gyroscopes, and magnetometers, and provide yaw, pitch, and roll angles of the device, or derivatives thereof.

The mobile device 710 further comprises a sensor processing unit 712 to process information from motion sensors 711, in order to compute at least a value of the yaw and pitch angle, or variations thereof. The motion sensors 711 and the sensor processing unit 712 may be integrated into a single chip or package. In a number of embodiments of the invention, the sensor processing unit is able to perform roll compensation to obtain a more accurate value of the yaw and pitch angles. In yet other embodiments of the invention, the sensor processing unit 712 can also process values of derivatives of yaw and pitch angles in order to obtain values of the yaw and pitch angle. According to various embodiments of the invention, the sensor processing unit 712 can be any type of application-specific processor configured to process values of yaw and pitch angles. It may be one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The pointing device 710 and/or the sensor processing unit may comprises a memory for storing the code to be executed, and for storing transient and/or permanent data needed for the different signal processing and calculations.

The mobile device 710 further comprises a wireless data communication port 713. This wireless data communication port 713 is used to communicate with the display system 720a. The communication may take place e.g. by radiofrequency pathway with a Bluetooth waveform and protocol or with a Wi-Fi waveform and protocol (802.11g Standard) or according to the RF4CE standard. Transmission can also be performed by infra-red pathway. The mobile device 710 further comprises a data bus 714 to communicate information within the mobile device. For example, the data bus 714 can be used to exchange values between the motion sensors and the sensor processing unit, and between the sensor processing unit and the wireless data communication port.

The display system 720a comprises a computation device 724a and a display 722a. The computation device 724a comprises a wireless data communication port 721a to receive data from the mobile device 710, and a processing unit 730a. The processing unit may output data representative of the cursor position to the display system which will show the cursor at the communicated position. The processing unit may comprise one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The combination of the sensor processing unit 712 in pointing device 710 and the processing unit 730 in display system 720 is responsible for converting the orientation signals into a cursor position. The different tasks may be distributed over these two processing units. In one embodiment, for example, sensor processing unit 712 converts the motion signals in yaw and pitch angles, which are then communicated to the processing unit 730a. Processing unit 730a subsequently converts these angles to a cursor position, for example using the methods discussed above, such as e.g. method 600, and transfers these cursor positions to the display/video system. In another embodiment, all the processing, from sensor signals to cursor position is performed in one of sensor processing unit 712 and processing unit 730a.

For example, the computation system 724a can be a base station or set-top box sold individually or with the mobile device or the display to display the cursor, and the display 722a can be a screen in connection with the computation system 724a. Alternatively, the computation system 724a may also be incorporated into display 722a.

This embodiment is advantageous, since the processing unit 730a is easy to configure. It is thus easy to modify the method used to calculate the position of the cursor, or parameters thereof. The management of the method of calculation of the position of the cursor can be performed separately from the management of the screen.

FIG. 7b displays a second exemplary embodiment 700b of a system for calculating a position of a virtual object in a finite screen according to the invention.

The second embodiment 700b of a system for calculating a position of a virtual object in a finite screen according to the invention also comprises the mobile device 710. It further comprises a display system 720b in communication with the mobile device 710. The display system comprises within the same housing a display 722b, a processing unit 730b specifically configured to calculate cursor positions and a wireless data communication port 721b.

The display 722b can be for example a screen, and the wireless data communication port 721b is similar to the wireless data communication port 721a. The processing unit can be any type of application-specific processing unit, such as an ASIC or an FPGA, configured to execute the method 600.

This embodiment advantageously limits the number of equipments, while permitting to manage and update easily the method of calculation of the position of the cursor.

FIG. 7c displays a third exemplary embodiment 700c of a system for calculating a position of a virtual object in a finite screen according to the invention.

It comprises a mobile device 710c and a display device 720c.

It comprises a mobile device 710c similar to the mobile device 710, except that it further comprises a cursor-specific calculator 730c. The cursor-specific calculator 730c is similar to the cursor-specific processing unit 730b, onboard the mobile device 730c.

The display device 720c comprises a display 722c and a wireless data communication port 721c. In the system 700c, the cursor-specific calculator 730c computes the position of the cursor onboard the mobile device 710c, and the wireless data communication port 713c sends it directly to the wireless data communication port 721c of the display device 720c, and the cursor is displayed directly on the display 722c.

This embodiment is advantageous, since the display device 720c receives only the position of the cursor. Thus, it can be used seamlessly with a pointing device according to the invention, or with another mobile pointing device.

The examples described above are given as illustrations of embodiments of the invention. They do not in any way limit the scope of the invention which is defined by the following claims.

The invention claimed is:

1. A processing logic for determining a position of a virtual object on a display configured to:
    receive from one or more motion sensors motion signals representative of an orientation of a first device and/or a derivative thereof;
    obtain a first set of data representative of at least the orientation of the first device based on the motion signals;
    obtain a second set of data representative of at least the orientation of the first device based on the motion signals, said second set of data being different from the first set of data;
    calculate a first candidate position of the virtual object on a display based on the first set of data;
    calculate a second candidate position of the virtual object on the display based on the second set of data;
    select one of the first candidate position and the second candidate position as a position of the virtual object on the display based at least on a comparison of the first candidate position and the second candidate position with a third position.

2. The processing logic of claim 1, wherein the first set of data and the second set of data are further representative of a position of the first device.

3. The processing logic of claim 1, wherein the orientation of the first device is with respect to a fixed reference frame, and wherein the first set of data comprises a first yaw angle of the first device and a first pitch angle of the first device, and the second set of data comprises a second yaw angle of the first device and a second pitch angle of the first device.

4. The processing logic of claim 3, wherein the first set of data further comprises a first roll angle of the first device, and the second set of data further comprises a second roll angle of the first device.

5. The processing logic of claim 3, wherein the first yaw angle, the first pitch angle, the second yaw angle, and the second pitch angle are defined with respect to a reference orientation, the first yaw angle is defined between $-\pi$ and $\pi$, the first pitch angle is defined between $-\pi/2$ and $\pi/2$, the second yaw angle is defined between $-\pi/2$ and $\pi/2$, and the second pitch angle is defined between $-\pi$ and $\pi$.

6. The processing logic of claim 5 wherein the reference orientation is a predefined orientation pointing towards a position of the display.

7. The processing logic of claim 5 wherein the reference orientation is defined by a user.

8. The processing logic of one of claim 1, wherein the third position is one of a previously displayed position of the virtual object and a position calculated from a previously displayed position of the virtual object, and the processing logic is configured to select one of the first candidate position and the second candidate position to display the virtual object based at least on a first difference between the first candidate position and the previously displayed position, and a second difference between the second candidate position and the previously displayed position.

9. The processing logic of claim 1, wherein the third position is a position at which the virtual object reached the limits of the display.

10. The processing logic of claim 9, further configured to select the first candidate position if the third position is on one of a left edge and a right edge of the display, and select the second candidate position if the third position is on one of a top edge and a bottom edge of the display.

11. The processing logic of claim 1, further configured to calculate at least one of the first candidate position and a second candidate position by:
    first calculating an intermediate position based on one of the first set of data and the second set of data;
    if the intermediate position is outside the display, calculate one of the first candidate position and a second candidate position based on the intermediate position.

12. The processing logic of claim 11, further configured to, if the intermediate position is outside the display, calculate one of the first candidate position and a second candidate position by projecting said intermediate position at a border of the display.

13. The system of claim 11, wherein the second device is incorporated within the display system.

14. A processing logic for determining a position of a virtual object on a display configured to:
    receive from one or more motion sensors motion signals representative of an orientation of a first device and/or a derivative thereof;

apply a transformation of said one or more motion signals into a set of data representative of at least the orientation of the first device;

calculate, based on said set of data representative of at least the orientation of the first device, a position of the virtual object on the display;

said processing logic being configured to:

initially select a first candidate transformation of said one or more motion signals into a set of data representative of at least the orientation of the first device in a first way of referencing as the transformation of said one or more motion signals into the set of data representative of at least the orientation of the first device;

determine, when the virtual object is within the screen, if a segment of a border of the display is reached by the virtual object;

based on the segment of the border of the display reached by the virtual object, select one of the first candidate transformation or a second candidate transformation of said one or more motion signals into the set of data representative of at least the orientation of the first device in a second way of referencing, different from the first way of referencing as the transformation of said one or more motion signals into the set of data representative of at least the orientation of the first device.

15. The processing logic of claim 14, configured to select the first candidate transformation if the segment of the border of the virtual display is one of a right and a left segment, or the second candidate transformation if the segment of the border of the virtual display is one of a top and a bottom segment.

16. The system of claim 15, wherein the motion sensors and the processing logic are incorporated within the first device and the first device is configured to send the position of the virtual object to the second device using the communication link.

17. The system of claim 16, wherein the processing logic is a processing unit for processing the motion sensors onboard the first device.

18. The system of claim 15, wherein

The first device comprises the motion sensors and is configured to send the motion signals to the second device using the wireless communication link;

The second device comprises the processing logic for determining the position of the virtual object on the display system.

19. A system for displaying a virtual object on a display comprising:

a first device which can be moved freely in space by a user;

a display system comprising a second device for controlling the virtual object on the display;

a wireless communication link between the first device and the second device;

a processing logic for determining a position of the virtual object on the display configured to:

receive from one or more motion sensors motion signals representative of an orientation of a first device and/or a derivative thereof;

obtain a first set of data representative of at least the orientation of the first device based on the motion signals;

obtain a second set of data representative of at least the orientation of the first device based on the motion signals, said second set of data being different from the first set of data;

calculate a first candidate position of the virtual object on a display based on the first set of data;

calculate a second candidate position of the virtual object on the display based on the second set of data;

select one of the first candidate position and the second candidate position as a position of the virtual object on the display based at least on a comparison of the first candidate position and the second candidate position with a third position.

20. A method for determining a position of a virtual object, comprising:

receiving from one or more motion sensors motion signals representative of an orientation of a first device and/or a derivative thereof;

obtaining a first set of data representative of at least the orientation of the first device based on the motion signals;

obtaining a second set of data representative of at least the orientation of the first device based on the motion signals, said second set of data being different from the first set of data;

calculating a first candidate position of the virtual object on a display based on the first set of data;

calculating a second candidate position of the virtual object on the display based on the second set of data;

selecting one of the first candidate position and the second candidate position as the position of the cursor on the display based at least on a comparison of the first candidate position and the second candidate position with a third position.

* * * * *